(12) United States Patent
Dämon et al.

(10) Patent No.: US 9,761,887 B2
(45) Date of Patent: Sep. 12, 2017

(54) ENERGY STORAGE

(71) Applicant: Samsung SDI Co., Ltd., Yongin-si, Gyeonggi-do (KR)

(72) Inventors: Peter Dämon, Laßnitzhöhe (AT); Stefan Roepke, Graz (AT); Mario Steiner, Tobelbad (AT); Thomas Trathnigg, Graz (AT)

(73) Assignee: Samsung SDI Co., Ltd., Yongin-si (KR)

(*) Notice: Subject to any disclaimer, the term of this patent is extended or adjusted under 35 U.S.C. 154(b) by 552 days.

(21) Appl. No.: 13/974,156

(22) Filed: Aug. 23, 2013

(65) Prior Publication Data

US 2014/0057148 A1    Feb. 27, 2014

(30) Foreign Application Priority Data

Aug. 23, 2012  (EP) ................................. 12181567

(51) Int. Cl.
*H01M 6/50*    (2006.01)
*H01M 2/10*    (2006.01)
*H01M 10/42*   (2006.01)
*B60L 11/18*   (2006.01)
*H01M 10/6567* (2014.01)
(Continued)

(52) U.S. Cl.
CPC ....... *H01M 6/5038* (2013.01); *B60L 11/1879* (2013.01); *H01M 2/1094* (2013.01);
(Continued)

(58) Field of Classification Search
CPC ........... H01M 10/504; H01M 10/5004; H01M 10/5079
See application file for complete search history.

(56) References Cited

U.S. PATENT DOCUMENTS 3,615,849 A * 10/1971 Hall ..................... H01M 8/00
                                                        429/435
6,627,345 B1 * 9/2003 Zemlok et al. ............. 429/99
(Continued)

FOREIGN PATENT DOCUMENTS

DE  10 2010 055614 A1   6/2012
JP     2009 193881 A    8/2009
(Continued)

OTHER PUBLICATIONS

Sabbahi, A., Vergnaud, J.M., "Absorption of Water by Polyurethane Foam. Modelling and Experiments", Sep. 1993, European Polymer Journal, vol. 29, Issue 9, pp. 1243-1246 (Abstract).*

(Continued)

*Primary Examiner* — Patrick Ryan
*Assistant Examiner* — Victoria Lynch
(74) *Attorney, Agent, or Firm* — Lewis Roca Rothgerber Christie LLP

(57) ABSTRACT

An energy storage apparatus having a housing, a plurality of battery cells, a temperature-control system with a liquid temperature-control medium for cooling and/or heating the battery cells in the housing. An absorbent element is arranged spatially between the battery cells and the housing such that any temperature-control medium escaping from the temperature-control system is absorbed by the absorbent element. The absorbent element is separated from the battery cells by an electrically insulating layer, the electrically insulating layer being impermeable to the temperature-control medium.

20 Claims, 3 Drawing Sheets

(51) Int. Cl.
*H01M 10/613* (2014.01)
*H01M 10/625* (2014.01)
*H01M 10/615* (2014.01)

(52) U.S. Cl.
CPC ..... *H01M 10/4207* (2013.01); *H01M 10/613* (2015.04); *H01M 10/6567* (2015.04); *H01M 10/615* (2015.04); *H01M 10/625* (2015.04); *H01M 2200/00* (2013.01); *Y02T 10/705* (2013.01); *Y02T 10/7005* (2013.01)

(56) References Cited

U.S. PATENT DOCUMENTS

| | | | | |
|---|---|---|---|---|
| 2007/0264535 | A1* | 11/2007 | Lee | H01M 2/0207 429/7 |
| 2009/0142628 | A1* | 6/2009 | Okada | H01M 2/0237 429/8 |
| 2009/0220851 | A1* | 9/2009 | Nakazawa | H01M 2/1016 429/58 |
| 2010/0136402 | A1 | 6/2010 | Hermann et al. | |
| 2011/0206948 | A1* | 8/2011 | Asai et al. | 429/7 |

FOREIGN PATENT DOCUMENTS

| | | |
|---|---|---|
| JP | 2010 211963 A | 9/2010 |
| WO | 03/103083 A2 | 12/2003 |

OTHER PUBLICATIONS

Professional Plastics, Insulating Materials, pp. 1-6.*
BASF, Basotect, pp. 1-20.*

* cited by examiner

ENERGY STORAGE

CROSS-REFERENCE TO RELATED APPLICATIONS

The present application claims priority 35 U.S.C. §119 to European Patent Application No. EP 121 81 567.4 (filed on Aug. 23, 2012), which is hereby incorporated by reference in its entirety.

TECHNICAL FIELD

Embodiments relate to an energy storage apparatus having a plurality of battery cells and a temperature-control system with a liquid temperature-control medium configured to cool and/or heat the battery cells in an energy storage housing.

BACKGROUND

Energy storage apparatus with a plurality of battery cells are used in particular as energy storage for driving electric and hybrid vehicles. In order to ensure an optimal function of the energy storage apparatus, it is necessary to hold the temperature of the battery cells in a desired operating range. In order to prevent the temperature from exceeding and/or falling below the operating temperature, active or passive temperature-control systems are used. The use of a liquid temperature-control medium that is guided along the battery cells with good thermal conduction, usually in a cooling body, has proven to be particularly effective.

It is problematic, however, for example, in the event of a collision involving a vehicle equipped in such a manner, that leakages, and therefore, the escape of the temperature-control medium from the cooling body may occur. The temperature-control medium may then come into direct contact with the battery cells and may trigger a short circuit due to its conductivity.

SUMMARY

Embodiments are related to an enhanced energy storage apparatus having a temperature-control system with a liquid temperature-control medium configured to cool and/or heat the battery cells in an energy storage housing. Such an energy storage apparatus is protected against the harmful effect of the temperature-control medium even if the temperature-control medium escapes from the temperature-control system.

In accordance with embodiments, an energy storage apparatus includes at least one of: a plurality of battery cells, and a temperature-control system with a liquid temperature-control medium configured to cool and/or heat the battery cells in an energy storage housing, and the electrically insulating layer being impermeable to the temperature-control medium; an absorbent element arranged between the battery cells and the energy storage housing such that any temperature-control medium which flows from the temperature-control system is absorbed by the absorbent element; and an electrically insulating layer configured to separate the absorbent element from the battery cells.

In accordance with embodiments, an energy storage apparatus includes at least one of: a housing; a plurality of battery cells arranged in the housing; a temperature-control system in the housing and with a liquid temperature-control medium which cools and/or heats the battery cells; an absorbent element arranged between the battery cells and the housing such that any temperature-control medium which flows out of the temperature-control system is absorbed by the absorbent element; and an electrically insulating layer which is impermeable to the temperature-control medium and arranged spatially between the absorbent element the battery cells.

In accordance with embodiments, an energy storage apparatus includes at least one of: a housing having a plurality of ribs which are spaced apart to define a gap; a plurality of battery cells arranged in the housing; a temperature-control system arranged in the housing to cool and/or heat the battery cells; a liquid temperature-control medium which flows through the temperature-control system; an absorbent element arranged in the gaps such that any temperature-control medium which flows out of the temperature-control system is absorbed by the absorbent element; and an electrically insulating layer which is impermeable to the temperature-control medium and arranged spatially between the absorbent element the battery cells In accordance with embodiments, an energy storage apparatus includes at least one of: a housing; a plurality of battery cells arranged in the housing; a temperature-control system arranged in the housing to cool and/or heat the battery cells; a liquid temperature-control medium which flows through the temperature-control system; a first absorbent element arranged at a first region of the housing to absorb any temperature-control medium which flows out of the temperature-control system; a first electrically insulating layer which is impermeable to the temperature-control medium and arranged at the first region of the housing spatially between the first absorbent element the battery cells; a second absorbent element arranged at a second region of the housing to absorb any temperature-control medium which flows out of the temperature-control system; and a second electrically insulating layer which is impermeable to the temperature-control medium and arranged at the second region of the housing spatially between the second absorbent element the battery cells.

In accordance with embodiments, the absorbent element is configured to absorb any escaping temperature-control medium. Temperature-control systems typically use relatively large amounts of temperature-control medium. Since the absorbent element together with absorbed temperature-control medium generally has at least low conductivity, and a risk of contact with battery cells due to any escaping amounts of temperature-control medium, a layer made of electrically insulating material is provided between the absorbent element and the battery cells. The electrically insulating material is impermeable to the temperature-control medium, and therefore, the temperature-control medium maynot flow back to reach the battery cells. Beyond the electrically insulating layer, the temperature-control medium may flow to the absorbent element.

All further present live components of the energy storage apparatus, such as battery cell connectors, voltage taps, or safety means, are preferably also separated from the absorbent elements by the electrically insulating layer.

In accordance with embodiments, the absorbent element is composed of a fluid-absorbing material, such as, for example, a fabric material. Such a fabric material may be a non-woven fabric. The fluid-absorbing material, may thus, be handled particularly easily and may be glued for example onto the energy storage housing.

In accordance with embodiments, the absorbent element is a bulk material. The absorbent element, may thus, easily reach indentations, edges and corners of the energy storage housing in loose form, for example, in the form of grains, and may also absorb escaping temperature-control medium at these locations.

In accordance with embodiments, receiving regions are formed at least over certain portions on the energy storage housing and the absorbent element is arranged in the receiving regions. For example, regions between ribs or corrugations may be used as receiving regions, and may simultaneously serve to strengthen the energy storage housing. The absorbent element is located exclusively in the receiving regions, such as, for example, between ribs of the energy storage housing.

In accordance with embodiments, a retaining layer may alternatively or additionally be provided spatially between the absorbent element and the insulating layer, the retaining layer being permeable to the temperature-control medium. In particular, if bulk material is used as an absorbent element, the absorbent element may indeed be held in its position by a retaining layer of this type in order, for example, to prevent the escape of the bulk material from the receiving regions of the energy storage apparatus should the energy storage apparatus be repositioned in such a manner that it is offset at an angle (i.e., tilted). The retaining layer may have a net-like structure and, for example, may be composed of nylon. The retaining layer may be attached, for example, by an adhesive, onto ribs of the energy storage housing in order to prevent the bulk material from passing from one receiving region into another receiving region.

In accordance with embodiments, the absorbent element may be arranged on and/or over at least two different sides of the energy storage housing. The absorbent element may be particularly arranged, with respective insulating layers, spatially between battery cells and the battery housing on and/or over at least two opposed sides of the energy storage housing. It is thus ensured that any escaping temperature-control medium is absorbed in various layers of the energy storage apparatus and also for various leakage positions.

DRAWINGS

Embodiments of the invention will be explained with reference to the drawings.

DESCRIPTION

Figure 1:
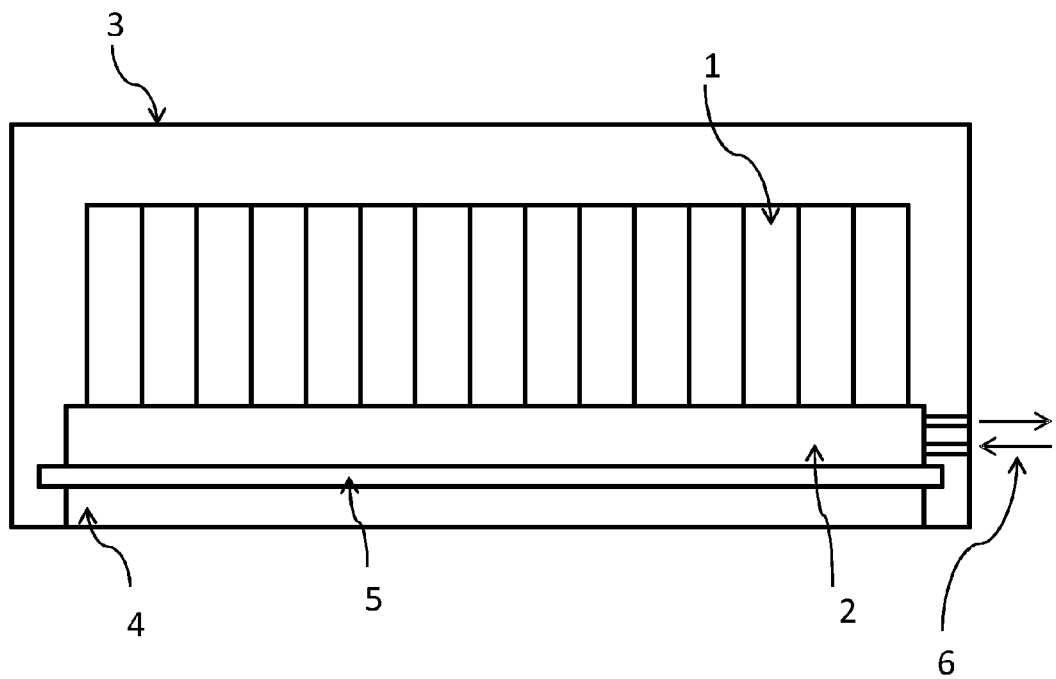
FIG. 1 illustrates a schematic illustration of an energy storage apparatus in accordance with embodiments of the invention.

An energy storage apparatus in accordance with embodiments of the invention is illustrated in FIG. 1, and includes a plurality of battery cells 1, a temperature-control system 2 with a cooling body which bears against, abuts, or otherwise physically contacts the battery cells 1, and an inlet/outlet 6 which permits entry and removal of a liquid temperature-control medium from the energy storage housing 3. The temperature-control system 2 serves, in operation, to cool and/or to heat the battery cells 1. The energy storage apparatus is spatially located with the battery cells 1 and the temperature-control system 2 in the energy storage housing 3. The energy storage housing 3 may be composed of a metal material, such as, for example, aluminium.

An absorbent element 4 is arranged spatially between the battery cells 1 and the energy storage housing 3. Temperature-control medium flowing out of (i.e., escaping from) the temperature-control system 2 may be absorbed by the absorbent element 4. The absorbent element 4 may, for example, be composed of a fluid-absorbing material. Such a fluid-absorbing material may be a fabric material, such as, for example, a non-woven fabric. Such a fluid-absorbing material may be composed of zeolite.

The absorbent element 4 is separated from the battery cells 1 by an electrically insulating layer 5, which is impermeable to the temperature-control medium. The electrically insulating layer 5 does not necessarily abut directly against the cooling body. For example, there may also be a spatial gap between the cooling body and the electrically insulating layer 5.

Figure 2:
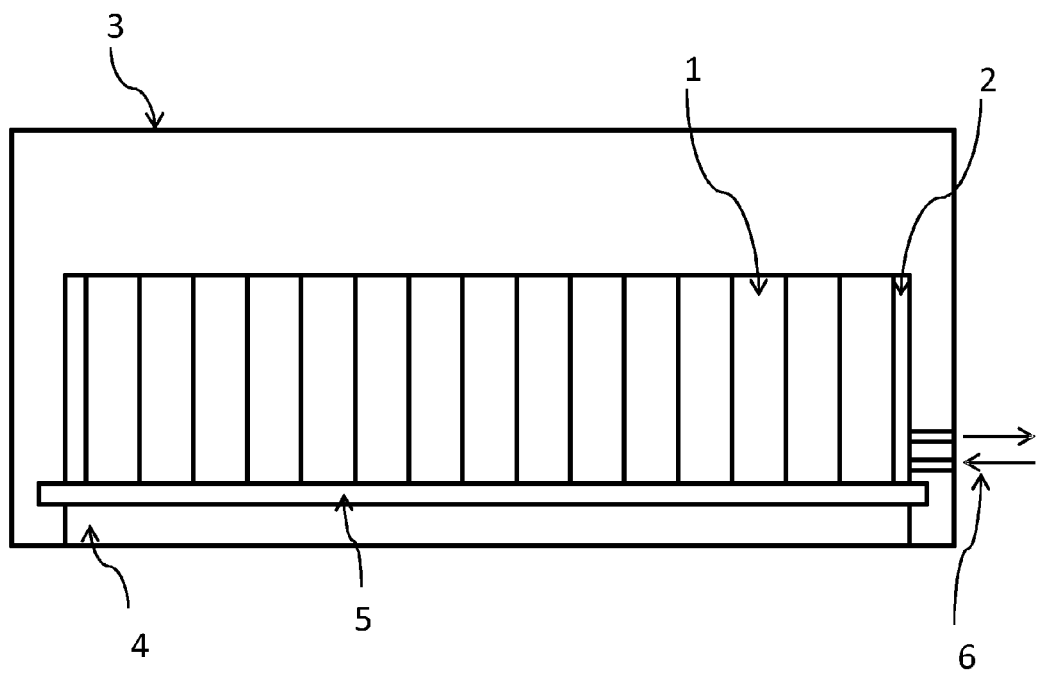
FIG. 2 illustrates a schematic illustration of an energy storage apparatus in accordance with embodiments of the invention.

As illustrated in FIG. 2, the cooling body of the temperature-control system 2 may also be arranged differently from the position illustrated in FIG. 1, in which it is located beneath and perpendicular with respect to the battery cells 1 and parallel with respect to the electrically insulating layer 5 and the absorbent element 4. In FIG. 2, the cooling body of the temperature-control system 2 is located laterally beside and in parallel with respect to the battery cells 1 and perpendicular with respect to the electrically insulating layer 5 and the absorbent element 4.

Figure 3:
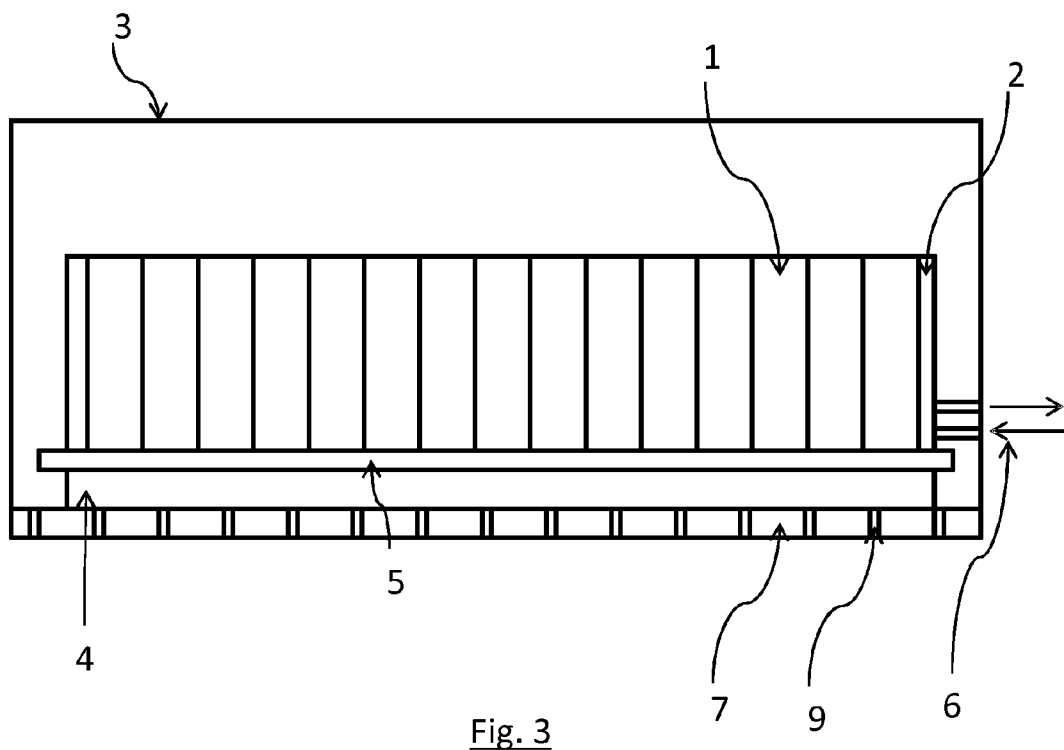
FIG. 3 illustrates a schematic illustration of an energy storage apparatus in accordance with embodiments of the invention.

As illustrated in FIG. 3, the energy storage housing 3 may also be equipped, for example, in some portions, with ribs/corrugations 9. The absorbent element 4 may then be pressed into gaps between adjacent ribs/corrugations 9, which serve as receiving regions 7 for the absorbent element 4. Temperature-control medium that has reached these gaps may thus also be absorbed.

Figure 4:
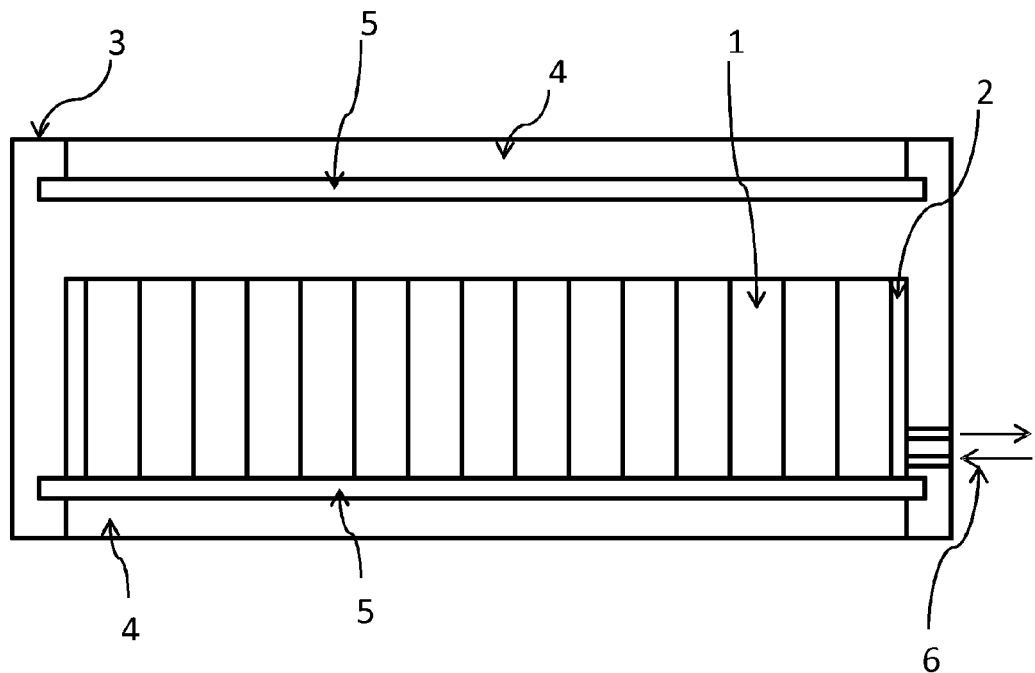
FIG. 4 illustrates a schematic illustration of an energy storage apparatus in accordance with embodiments of the invention.

As illustrated in FIG. 4, the arrangement of absorbent elements 4 and electrically insulating layers 5 is also possible in a plurality of regions of the energy storage apparatus. For example, absorbent elements 4 and electrically insulating layers 5 may be arranged on two mutually opposed sides of the battery cells 1.

The absorbent elements 4 may be positioned such that escaping temperature-control medium may be absorbed quickly and reliably. Absorbent elements 4 are therefore arranged, in particular, adjacent to interfaces of the temperature-control system 2, such as in the inlet/outlet 6 for the temperature-control medium, at which the likelihood of a leakage is greatest.

Figure 5:
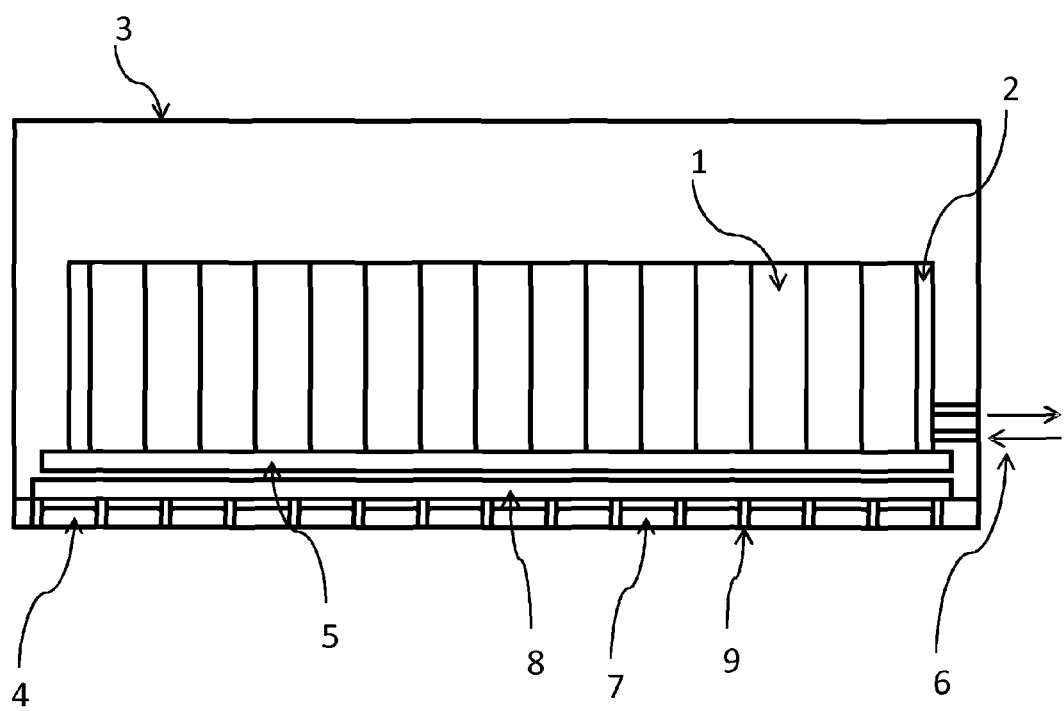
FIG. 5 illustrates a schematic illustration of an energy storage apparatus in accordance with embodiments of the invention.

As illustrated in FIG. 5, the absorbent element 4 in the form of bulk material, i.e., in loose form, is located in the receiving regions 7 between adjacent ribs/corrugations 9. In order to prevent the bulk material from being distributed undesirably, for example, should the energy storage apparatus be in an offset, tilted position, a retaining layer 8 is provided between the bulk material and the electrically insulating layer 5. The retaining layer 8 is permeable to the temperature-control medium, but is at least largely impermeable to the bulk material. The retaining layer 8 may have a net-like structure and, for example, be formed of nylon. The retaining layer 8 may be attached via an adhesive onto the surfaces of the ribs/corrugations 9 of the energy storage housing facing towards the battery cells 1. A spatial gap may be provided between the retaining layer 8 and the electrically insulating layer 5, such that any escaping temperature-control medium may reach the absorbent elements 4 more easily. The spatial gap and the absorbent element 4 may also be formed such that the spatial gap is closed by a swelling absorbent element 4 when the absorbent element 4 receives temperature-control medium.

Embodiments of the invention therefore provide for an energy storage apparatus that, even if temperature-control medium escapes from a temperature-control system, is protected against the harmful effect of the temperature-control medium in the energy storage apparatus.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art

LIST OF REFERENCE SIGNS 1 battery cells
2 temperature-control system
3 energy storage apparatus housing
4 absorbent element
5 electrically insulating layer
6 inlet/outlet
7 receiving region
8 retaining layer
9 rib/corrugation

What is claimed is:

1. An energy storage apparatus comprising:
a housing;
a plurality of battery cells arranged in the housing;
a temperature-control system arranged in the housing and with a liquid temperature-control medium which flows therethrough to cool and/or heat the battery cells;
an absorbent element arranged between the battery cells and the housing in a first direction such that any temperature-control medium which flows out of the temperature-control system is absorbed by the absorbent element; and
an electrically insulating layer which is impermeable to the temperature-control medium and arranged spatially between the absorbent element and at least a portion of the temperature-control system in the first direction and between the absorbent element and the battery cells in the first direction,
wherein a first distance between the battery cells and the absorbent element is greater than a second distance between the battery cells and the temperature-control system.

2. The energy storage apparatus of claim 1, wherein the absorbent element comprises a bulk material.

3. The energy storage apparatus of claim 1, further comprising a retaining layer which is permeable to the temperature-control medium and arranged between the absorbent element and the insulating layer.

4. The energy storage apparatus of claim 1, wherein the absorbent element is arranged on at least two different sides of the housing.

5. The energy storage apparatus of claim 1, further comprising an inlet and an outlet which permit flow of the liquid temperature-control medium into and out of the temperature-control system.

6. The energy storage apparatus of claim 1, wherein the temperature-control system is located beneath and perpendicular with respect to the battery cells, and also parallel with respect to the electrically insulating layer and the absorbent element.

7. The energy storage apparatus of claim 1, wherein the temperature-control system is located laterally beside and in parallel with respect to the battery cells, and also perpendicular with respect to the electrically insulating layer and the absorbent element.

8. An energy storage apparatus comprising:
a housing having a plurality of ribs which are spaced apart to define a gap;
a plurality of battery cells arranged in the housing;
a temperature-control system arranged in the housing to cool and/or heat the battery cells;
a liquid temperature-control medium which flows through the temperature-control system;
an absorbent element arranged in the gap such that any temperature-control medium which flows out of the temperature-control system is absorbed by the absorbent element; and
an electrically insulating layer which is impermeable to the temperature-control medium and arranged spatially between the absorbent element the battery cells.

9. The energy storage apparatus of claim 8, wherein the absorbent element comprises a bulk material.

10. The energy storage apparatus of claim 8, wherein the absorbent element is arranged on at least two different sides of the housing.

11. The energy storage apparatus of claim 8, further comprising an inlet and an outlet which permit flow of the liquid temperature-control medium into and out of the temperature-control system.

12. The energy storage apparatus of claim 8, wherein the temperature-control system is located beneath and perpendicular with respect to the battery cells, and also parallel with respect to the electrically insulating layer and the absorbent element.

13. The energy storage apparatus of claim 8, wherein the temperature-control system is located laterally beside and in parallel with respect to the battery cells, and also perpendicular with respect to the electrically insulating layer and the absorbent element.

14. An energy storage apparatus comprising:
a housing;
a plurality of battery cells arranged in the housing;
a temperature-control system arranged in the housing and under the battery cells in a first direction to cool and/or heat the battery cells;
a liquid temperature-control medium which flows through the temperature-control system;
a first absorbent element arranged at a first region of the housing under the battery cells in the first direction to absorb any temperature-control medium which flows out of the temperature-control system;
a first electrically insulating layer which is impermeable to the temperature-control medium and arranged at the first region of the housing spatially between the first absorbent element and at least a portion of the temperature-control system;
a second absorbent element arranged at a second region of the housing over the battery cells in the first direction to absorb any temperature-control medium which flows out of the temperature-control system; and a second electrically insulating layer which is impermeable to the temperature-control medium and arranged at the second region of the housing spatially between the second absorbent element and the battery cells.

15. The energy storage apparatus of claim 14, wherein the first and second absorbent elements comprise a bulk material.

16. The energy storage apparatus of claim 14, further comprising an inlet and an outlet which permit flow of the liquid temperature-control medium into and out of the temperature-control system.

17. The energy storage apparatus of claim 14, wherein the temperature-control system is located beneath and perpendicular with respect to the battery cells, and also parallel with respect to one of the first and second electrically insulating layers and the corresponding one of the first and second absorbent elements.

18. The energy storage apparatus of claim 14, wherein the temperature-control system is located laterally beside and in parallel with respect to the battery cells, and also perpendicular with respect to one of the first and second electrically insulating layers and the corresponding one of the first and second absorbent elements.

19. The energy storage apparatus of claim 14, wherein the first region and the second region are located at mutually opposed sides of the battery cells.

20. The energy storage apparatus of claim 1, wherein the temperature-control system is sealed in the housing.

* * * * *